(12) United States Patent
Hamada

(10) Patent No.: US 11,550,524 B1
(45) Date of Patent: Jan. 10, 2023

(54) INFORMATION PROCESSING APPARATUS AND METHOD AND NON-TRANSITORY COMPUTER READABLE MEDIUM

(71) Applicant: FUJIFILM Business Innovation Corp., Tokyo (JP)

(72) Inventor: Makoto Hamada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/544,326

(22) Filed: Dec. 7, 2021

(30) Foreign Application Priority Data

Jul. 20, 2021 (JP) .............................. JP2021-120012

(51) Int. Cl.
*G06F 15/00* (2006.01)
*G06F 1/00* (2006.01)
*G06K 1/00* (2006.01)
*G06F 3/12* (2006.01)

(52) U.S. Cl.
CPC .......... *G06F 3/1273* (2013.01); *G06F 3/1204* (2013.01); *G06F 3/1207* (2013.01); *G06F 3/1253* (2013.01); *G06F 3/1274* (2013.01)

(58) Field of Classification Search
CPC .... G06F 3/1273; G06F 3/1204; G06F 3/1207; G06F 3/1253; G06F 3/1274
USPC .............................. 358/1.13, 1.14, 1.15, 1.1
See application file for complete search history.

(56) References Cited

U.S. PATENT DOCUMENTS

| 2011/0041091 | A1* | 2/2011 | Sato ..................... G06F 3/04817 715/772 |
| 2013/0166579 | A1* | 6/2013 | Saito ....................... G06F 16/93 707/758 |
| 2022/0137906 | A1* | 5/2022 | Ogawa .................. G06F 3/1205 358/1.15 |

FOREIGN PATENT DOCUMENTS

JP           2014-212575 A      11/2014

* cited by examiner

*Primary Examiner* — Douglas Q Tran
(74) *Attorney, Agent, or Firm* — Sughrue Mion, PLLC

(57) ABSTRACT

An information processing apparatus includes a processor configured to: store document information of a document in a predetermined storage region when processing that does not include a storing process of the document is executed on the document; display the document information stored in the predetermined storage region on a display when executing processing, the document information including at least one item of the document information, and cause a user to select an item of the document information from the at least one item of the document information; and execute processing by using the selected item of the document information.

20 Claims, 7 Drawing Sheets

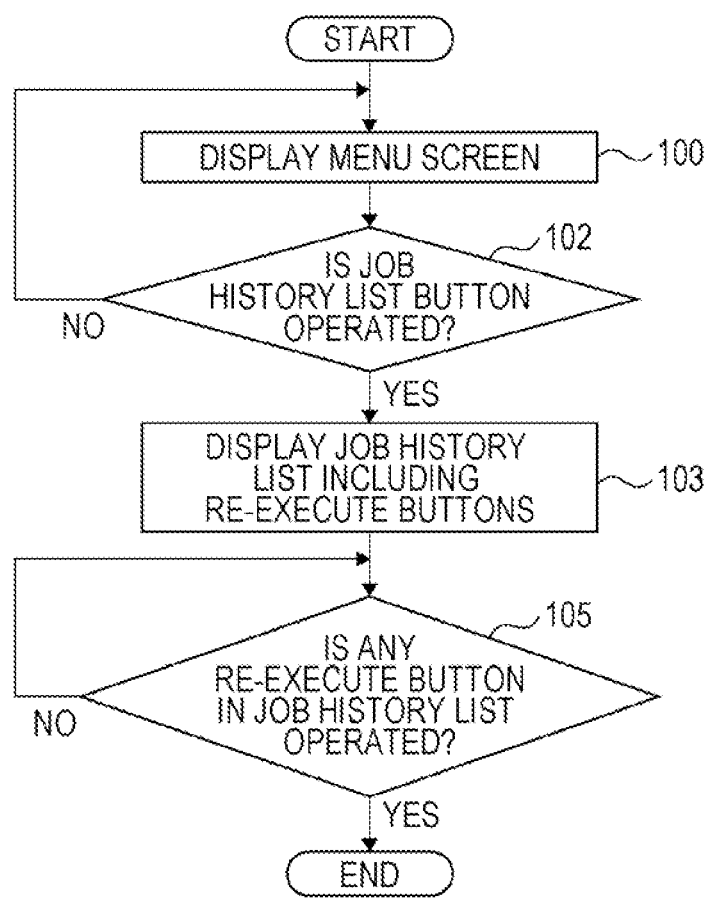

INFORMATION PROCESSING APPARATUS AND METHOD AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-120012 filed Jul. 20, 2021.

BACKGROUND

(i) Technical Field

The present disclosure relates to an information processing apparatus and method and a non-transitory computer readable medium.

(ii) Related Art

Japanese Unexamined Patent Application Publication No. 2014-212575 discloses the following image processing system. In response to specifying a send job and to providing an instruction to transfer this job, the history of this job is recorded. If a user wishes to resend a job by changing a destination, the user first specifies a desired job by using a web browser of a host computer and changes or adds a destination if necessary. The user then gives an instruction to resend this job.

SUMMARY

If an instruction to store document information of a document before processing this document is provided, the stored document information can be reused to execute processing. Without such an instruction, the document information is not stored. If a user wishes to reuse a document and also the content of the past execution of processing by changing settings, the user is required to reread the document since the document information and setting information are not stored. If a user wishes to reuse the content of the past execution of processing to form an image, for example, the user is required to resend document information to an image forming apparatus since the document information is not stored.

Aspects of non-limiting embodiments of the present disclosure relate to an information processing apparatus and method and a non-transitory computer readable medium that make it possible to reuse document information used in the past execution of processing without providing an instruction to store the document information before the execution of processing.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: store document information of a document in a predetermined storage region when processing that does not include a storing process of the document is executed on the document; display the document information stored in the predetermined storage region on a display when executing processing, the document information including at least one item of the document information, and cause a user to select an item of the document information from the at least one item of the document information; and execute processing by using the selected item of the document information.

BRIEF DESCRIPTION OF THE DRAWINGS

An exemplary embodiment of the present disclosure will be described in detail based on the following figures, wherein:

FIG. 7 is a flowchart illustrating an example of a modified example of processing executed by the controller of the image forming apparatus from when a job history is displayed until when an instruction to re-execute a job is provided.

DETAILED DESCRIPTION

An exemplary embodiment of the disclosure will be described below in detail with reference to the accompanying drawings. In the exemplary embodiment, an information processing apparatus will be discussed through illustration of an image forming apparatus.

Figure 1:
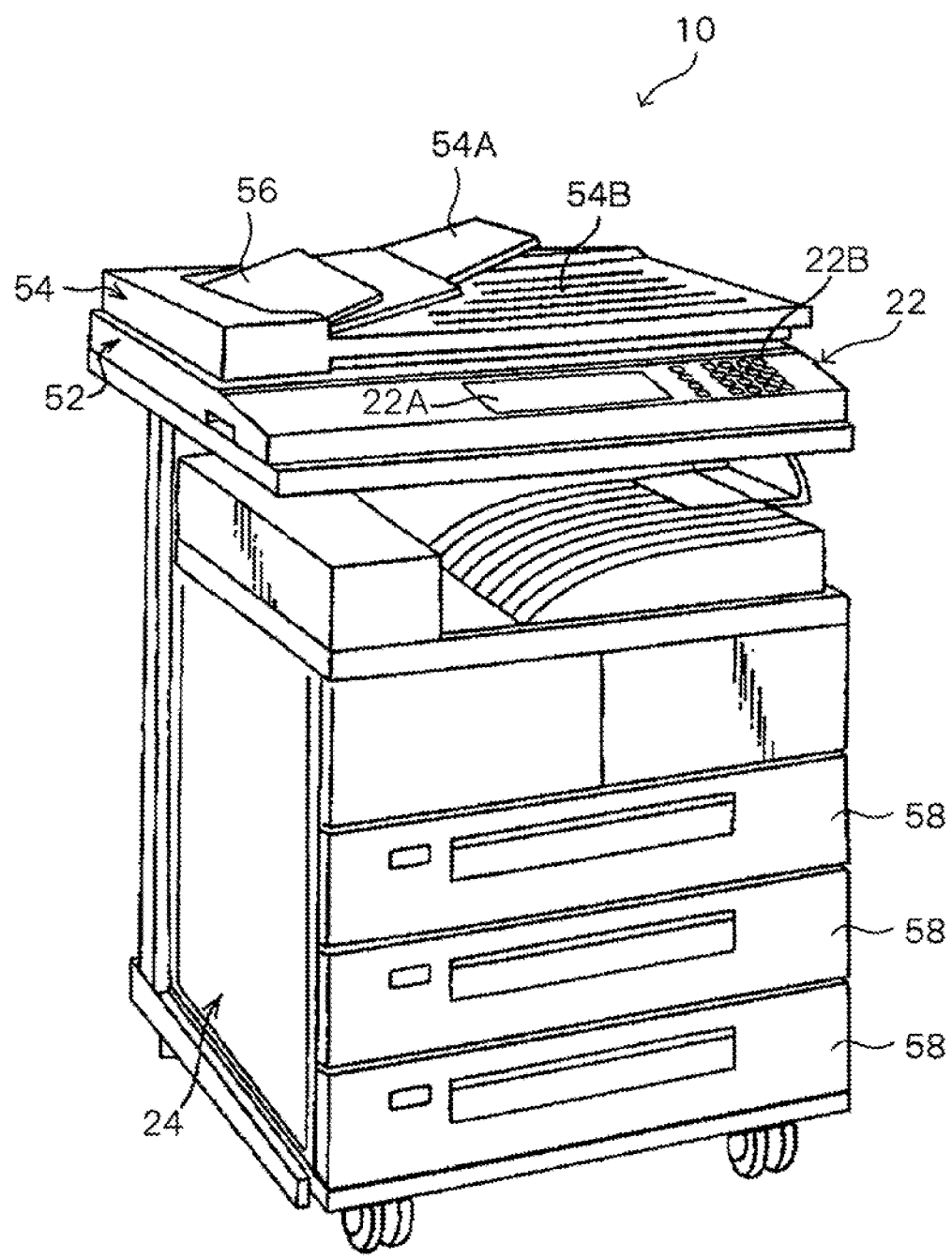
FIG. 1 is a perspective view of the external appearance of an image forming apparatus according to the exemplary embodiment.

FIG. 1 is a perspective view of the external appearance of an image forming apparatus 10 according to the exemplary embodiment. The image forming apparatus 10 has a print function of receiving various items of data via a communication line, such as a network, and forming an image based on a received item of data. The image forming apparatus 10 has other multiple functions, such as a read function of reading a document and generating image information indicating the read document, a copy function of copying an image recorded on a document onto a sheet, a fax function of sending and receiving various items of data via a telephone line (not shown), a transfer function of transferring document information, such as image information, generated as a result of reading a document, and a storing function of storing document information, such as image information, generated as a result of reading a document.

The image forming apparatus 10 includes a document reader 52 at the top and an image forming unit 24 under the document reader 52. The document reader 52 includes a document transporter (not shown) in a document covering part 54. The document transporter sequentially pulls in documents 56 placed on a document feeder 54A of the document covering part 54, transfers the documents 56 to platen glass (not shown), and reads images recorded on the documents 56. The document transporter also outputs the documents 56 on which images are formed onto a document output portion 54B of the document covering part 54.

The document reader 52 includes a user interface 22 that receives various instruction operations from a user. The user interface 22 includes a display 22A and a hardware keypad 22B, such as a numerical keypad. On the display 22A, various items of information and display buttons implemented by a software program to receive instruction operations are displayed. As the display 22A, a touchscreen display, which serves as both of a display, such as a liquid crystal display panel, and a locator device, such as a touchpad, is used. The user interface 22 may be used for a user to use the copy function and the fax function. More specifically, a user may use the display buttons on the display 22A or the hardware keypad 22B to set the number of copies and the magnification factor when using the copy function or may use the display buttons or the hardware keypad 22B as a dial keypad to input a fax number when using the fax function. The provision of the hardware keypad 22B may be omitted.

The image forming unit 24 includes sheet storage trays 58 for storing sheets, which serve as a recording medium for forming images. The image forming unit 24 removes sheets one by one from a sheet storage tray 58 and forms an image based on image data on each sheet according to an electrophotographic process. The image forming unit 24 also outputs sheets on which images are formed onto a sheet discharge tray (not shown), for example.

Figure 2:
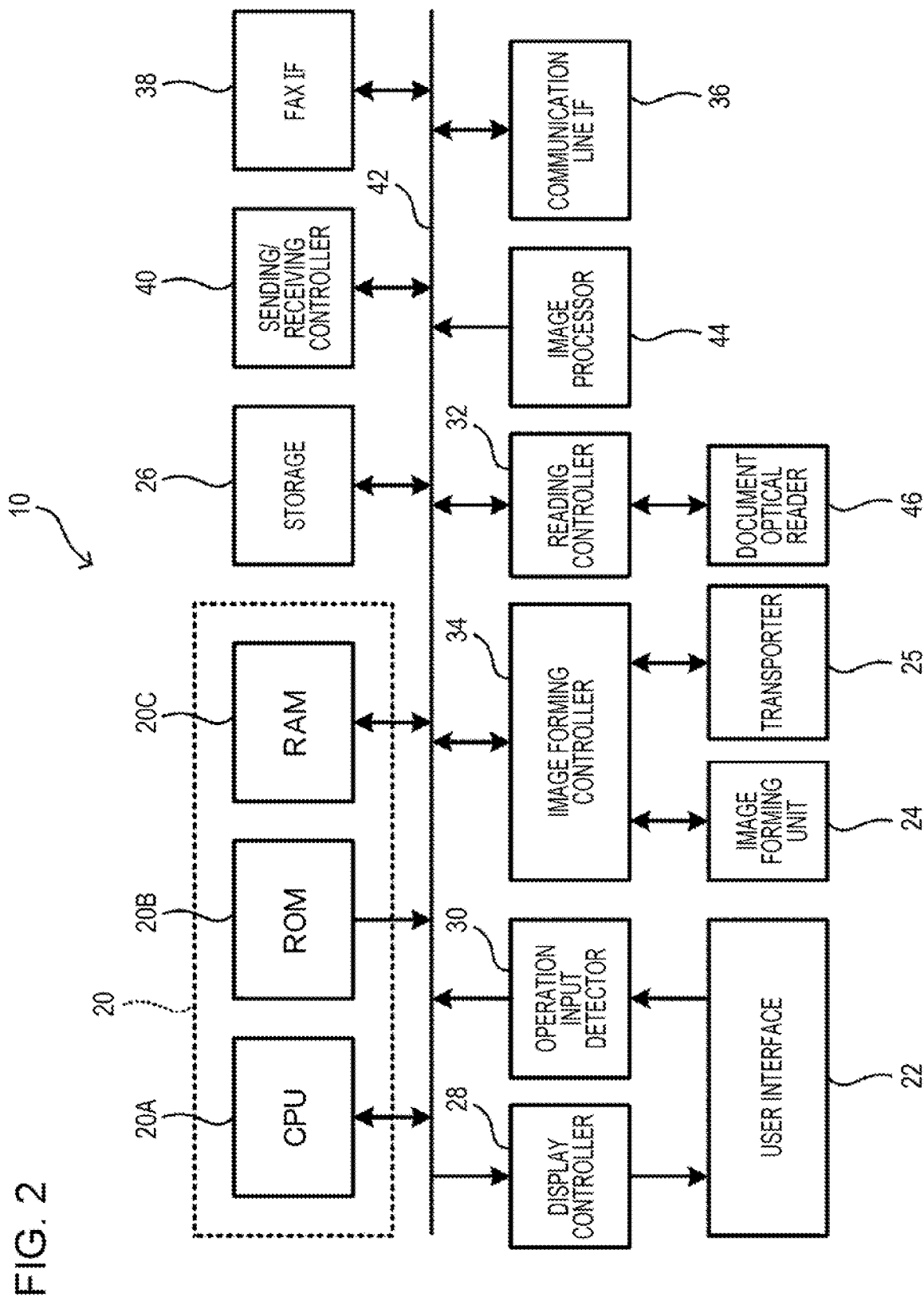
FIG. 2 is a block diagram illustrating major parts of an electrical system of the image forming apparatus.

FIG. 2 is a block diagram illustrating major parts of an electrical system of the image forming apparatus 10.

As shown in FIG. 2, the image forming apparatus 10 includes a controller 20 having a central processing unit (CPU) 20A, a read only memory (ROM) 20B, and a random access memory (RAM) 20C. The CPU 20A controls the entire operation of the image forming apparatus 10. The RAM 20C is used as a work area for the CPU 20A to execute various programs. In the ROM 20B, various control programs and various parameters, for example, are stored in advance. In the image forming apparatus 10, the CPU 20A, the ROM 20B, and the RAM 20C of the controller 20 are electrically connected to each other via a system bus 42.

The image forming apparatus 10 includes a storage 26, a display controller 28, and an operation input detector 30. The storage 26 stores various items of data and application programs. The display controller 28 is connected to the user interface 22 and controls the displaying of various operation screens on the display 22A of the user interface 22. The operation input detector 30 is connected to the user interface 22 and detects an instruction input via the user interface 22. In the image forming apparatus 10, the storage 26, the display controller 28, and the operation input detector 30 are electrically connected to the system bus 42. As the storage 26, a hard disk drive (HDD) may be used, or a non-volatile storage, such as a flash memory, may alternatively be used.

The image forming apparatus 10 also includes a reading controller 32 and an image forming controller 34. The reading controller 32 controls an optical image-reading operation performed by a document optical reader 46 and a document transport operation performed by the document transporter. The image forming controller 34 controls image forming processing executed by the image forming unit 24 and the transporting of a sheet to the image forming unit 24 performed by a transporter 25. The image forming apparatus 10 also includes a communication line interface (communication line IF) 36, an image processor 44, a fax interface (fax IF) 38, and a sending/receiving controller 40. The communication line interface 36 is connected to a communication line (not shown) and sends and receives communication data to and from other external devices, such as a server, connected to the communication line. The image processor 44 executes various image processing operations. The fax interface 38 is connected to a telephone line (not shown) and sends and receives fax data to and from a fax device connected to the telephone line. The sending/receiving controller 40 controls sending/receiving of fax data via the fax interface 38. In the image forming apparatus 10, the sending/receiving controller 40, reading controller 32, image forming controller 34, communication line interface 36, fax interface 38, and image processor 44 are electrically connected to the system bus 42.

With the above-described configuration, by using the CPU 20A, the image forming apparatus 10 makes access to each of the RAM 20C, the ROM 20B, and the storage 26. By using the CPU 20A, the image forming apparatus 10 performs the following various control operations, for example: displaying of operation screens and information, such as various message, on the display 22A of the user interface 22 via the display controller 28; activation of the document optical reader 46 and the document transporter via the reading controller 32; activation of the image forming unit 24 and the transporter 25 via the image forming controller 34; sending/receiving of communication data via the communication line interface 36; and sending/receiving of fax data by the sending/receiving controller 40 via the fax interface 38. By using the CPU 20A, the image forming apparatus 10 also identifies the content of operation performed with the user interface 22, based on operation information detected by the operation input detector 30, and then performs various control operations based on the identified content of operation.

Figure 3:
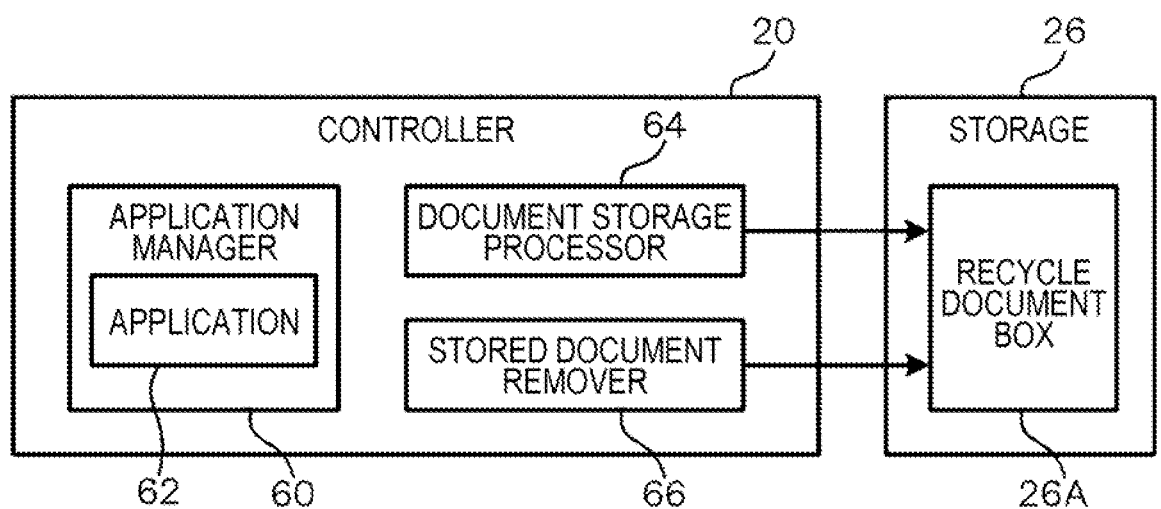
FIG. 3 is a functional block diagram illustrating an example of the functional configuration of a controller of the image forming apparatus.

As a result of the CPU 20A of the controller 20 loading a program stored in the ROM 20B into the RAM 20C and executing the program, the image forming apparatus 10 implements various functions. The functional configuration of the image forming apparatus 10 will be described below with reference to FIG. 3. FIG. 3 is a functional block diagram illustrating an example of the functional configuration of the controller 20 of the image forming apparatus 10.

The controller 20 has functions, such as an application manager 60, a document storage processor 64, and a stored document remover 66.

The application manager 60 manages installed applications 62 and also controls the execution of the applications 62. Although only one application 62 is shown in FIG. 3, plural applications 62 are installed in the image forming apparatus 10. An example of the applications 62 is an application for providing a service using multiple functions of the image forming apparatus 10. More specifically, the image forming apparatus 10 stores an application for providing a service using at least one of the above-described print function, read function, copy function, fax function, transfer function, and storing function.

When processing that does not include a storing process of a document is executed on the document, the document storage processor 64 stores document information of this document in a recycle document box 26A, which is a predetermined special storage region. When executing processing, the controller 20 displays items of document information stored in the recycle document box 26A on the display 22A of the user interface 22 and instructs a user to select an item of document information. The controller 20 then executes output processing by using the selected item of document information. As an example of the output processing, the document storage processor 64 causes the application manager 60 to execute processing, such as image forming, based on the selected item of document information and outputs the document.

The stored document remover 66 removes some items of document information stored in the recycle document box 26A in accordance with a predetermined condition.

In a typical image processing apparatus, services using a copy function, a print function, a read function, a fax function, and a transfer function, or a combination thereof are available as major document processing services. When a user uses such a service, document information is temporarily stored in a storage of the image processing apparatus. However, it is not possible for the user to be aware of the presence of the document information. For example, the user is unable to view the document information on a screen or to access it. After document processing is completed, the document information is automatically deleted from the storage.

If a user wishes to store document information in the image forming apparatus 10, it uses a box service, such as a confidential box. In this case, the user transfers the document information in the storage 26 to the confidential box so that it can access the document information by using the user interface 22, for example, and receive a specific service (a transfer function, a fax function, and a print function, for example). Even after the user has received the service, the document information is not automatically deleted. The document information is deleted only when the user clearly shows its intention to delete it via a deleting operation.

When the same content of processing is executed with a box service and without, processing using a box service involves more operation steps and tends to take a longer time. For example, if a user wishes to simply store a paper document in a specific file server as digital data, it can use a service for reading the document and transferring it to the file server. If, however, the user wishes to store the document in a box as well as in a file server, it is required to store the read document and then output it to the box.

It is now assumed that a user uses a box, such as a confidential box, and wishes to execute output processing for a document. In this case, if the user expects to reuse the same document, it voluntarily uses a box service and stores the document in the box, thereby making it easy to re-execute output processing for the document. When re-executing output processing, the user specifies document information to be subjected to processing by using a box service and provides an instruction to output the document, such as forming an image of the document or transferring the document. This eliminates the need for the user to reinput the document, such as rereading the document, but the user is still required to reinput parameters on a screen to re-execute the processing. For example, the user needs to input a destination as one of the parameters if it wishes to transfer the document.

In contrast, if the user does not expect to reuse the same document, it is likely to use a regular service which dost not involve document storing to save the time. That is, the user is likely to use a service for simply reading the document and transferring it. In this case, since past document information is not stored in the storage 26 of the image forming apparatus 10, the user is required to repeat the entire operation including inputting of the document, such as reading of the document, all over again.

To address the above-described issue, in the image forming apparatus 10, the controller 20 executes the following processing, which will be described below specifically.

Even after a job using a regular service which does not involve document storing, such as reading and transferring a document, is completed, the document storage processor 64 does not completely delete document information used in the job. Instead, the document storage processor 64 stores such document information in the recycle document box 26A, which serves as a special storage region of the storage 26. When storing the document information, the document storage processor 64 links it with a log ID and manages the document information together with the log ID. The log ID serves as history information of the job executed for the document.

In the case of document information for a job using a box service, such as a confidential box, the document storage processor 64 stores the document information in the recycle document box 26A if the document information is to be deleted from the confidential box after the job is completed.

The recycle document box 26A, which serves as a special storage region, is a region separately provided from a confidential box. A job refers to processing or a set of processing operations to be executed by the image forming apparatus 10 to implement a predetermined function.

On the user interface 22 of the image forming apparatus 10, an initial display screen, such as a predetermined menu screen, switches to a job history list with a small number of steps. For example, a history screen display button is displayed on the menu screen, and when it is operated, a job history list is displayed. In the job history list, two types of jobs, that is, jobs using a box service, such as a confidential box, and jobs using a regular service that does not involve document storing are mixed together. Jobs using a box service require only document output, while jobs using a regular service require document input and document output. The job history list may be displayed according to the job type.

For a job selected from the job history list, if document information used in this job is stored in the recycle document box 26A or a confidential box, part of an image of the document information is displayed as a job history, as well as detailed information of this job (such as the execution date and the processing content).

When displaying the job history list, a user may be identified by user authentication, and the histories of jobs only executed by this identified user in the past may be displayed, while the job histories of the other users may not be displayed. Alternatively, for the history of a job executed by the identified user in the past, part of an image of the document used in this job may be displayed, as well as detailed information including setting information on the job. For the history of a job executed by another user in the past, only detailed information including setting information on the job may be displayed.

In a job history of a document, a re-execute button is displayed regardless of whether document information used at the time of the previous execution of processing is stored. When a user has operated the re-execute button, if the document information is stored, a check screen is displayed to check whether the same document will be reused or another document will be reused, and a response from the user is received.

If the user has selected that the previously used document will be subjected to processing again, a document output setting screen is displayed in a state in which parameters used in the previous execution of processing are set as defaults. For both of jobs executed using a box service and those executed using a regular service, the document output setting screen is displayed. The user adjusts parameters if necessary, and when the user has operated a start button, document output processing, such as transfer processing, is executed on the previously used document in accordance with the user settings.

If the user has selected a job executed using a box service from the job history list and also has selected a new document on the check screen, a selection screen is displayed to select a document stored in a confidential box. After the user has selected a document, the document output setting screen is displayed in a state in which parameters used in the previous execution of processing are set as defaults. The user adjusts parameters if necessary, and when the user has operated the start button, document output processing, such as transfer processing, is executed on the selected document in accordance with the user settings.

If the user has selected a job executed using a service other than a box service from the job history list and also has selected a new document on the check screen, a setting screen for both document input and document output is displayed in a state in which parameters used in the previous execution of processing are set as defaults. The user adjusts parameters if necessary, and when the user has operated the start button, document input processing, such as scanning, and then, document output processing, such as transfer processing, are sequentially executed on the selected document in accordance with the user settings.

In the case of processing for reading and transferring a document, as document transfer parameters, a transfer method, such as a protocol, destination information in a format corresponding to the transfer method, a file name, and special settings (encryption and signature, for example) unique to the transfer method are displayed.

In the case of processing for reading and transferring a document, as document reading parameters, a color mode, a file format, and resolution are displayed. In actuality, however, document reading is not performed, and image information used in the previous execution of processing is merely converted. Accordingly, only the parameters that can be converted are displayed and set. For example, it is not possible that an image whose previous color mode is black and white be converted into a color image and that an image whose previous resolution is 200 dots per inch (dpi) be converted into a 300-dpi image. Parameters that can be changed or those that cannot be changed may be displayed in a mode recognizable for a user. For example, parameters that can be changed and those that cannot be changed may be displayed in different modes, such as in different colors or different display densities. Alternatively, parameters that cannot be changed may be displayed in a recognizable mode, for example, such parameters may be grayed out.

According to the above-described processing executed by the document storage processor 64, input image information is stored in the storage 26, but if the storage 26 or the recycle document box 26A has become full, no more document information can be stored.

To address this issue, the document storage processor 64 selects a document to be stored in accordance with a predetermined condition so that the storage 26 does not become full. Additionally, when the storage 26 or the recycle document box 26A has become full, the stored document remover 66 selects and removes less necessary document information from the stored documents.

When the document storage processor 64 selects a document to be stored, a predetermined condition is applied in accordance with a destination of the document or the property of a job for the document. For example, when the content of a job executed on a document satisfies a predetermined condition or when a destination of a document satisfies a predetermined condition, such a document is selected and stored. Examples of the predetermined condition are:

- when the entirety or part of job processing for a document is terminated with an error;
- when document input processing takes time (for example, for a document having a specific number of pages or more or a specific file size or more)
- when a user has manually selected on the user interface 22 that a document will be stored;
- when a specific user has processed a job for a document;
- when a document is read and transferred to plural destinations (a predetermined number of destinations or more), considering the possibility that the document is transferred to another destination;
- when a document is read and transferred to a destination to which the document has not been sent before, considering the possibility that a user resends the document to a wrong destination;
- when a destination of a document to be read and transferred is manually input instead of from an address book, considering the possibility that a user resends the document by inputting a wrong destination; and
- when the image of a document has not been stored before.

Examples of less necessary document information to be selected and removed by the stored document remover 66 are:

- document information stored at the oldest time (based on first in, first out (FIFO));
- document information stored for a preset period (one week, for example); and
- document information reused less frequently.

Specific processing to be executed by the controller 20 of the image forming apparatus 10 will be described below.

Figure 4:
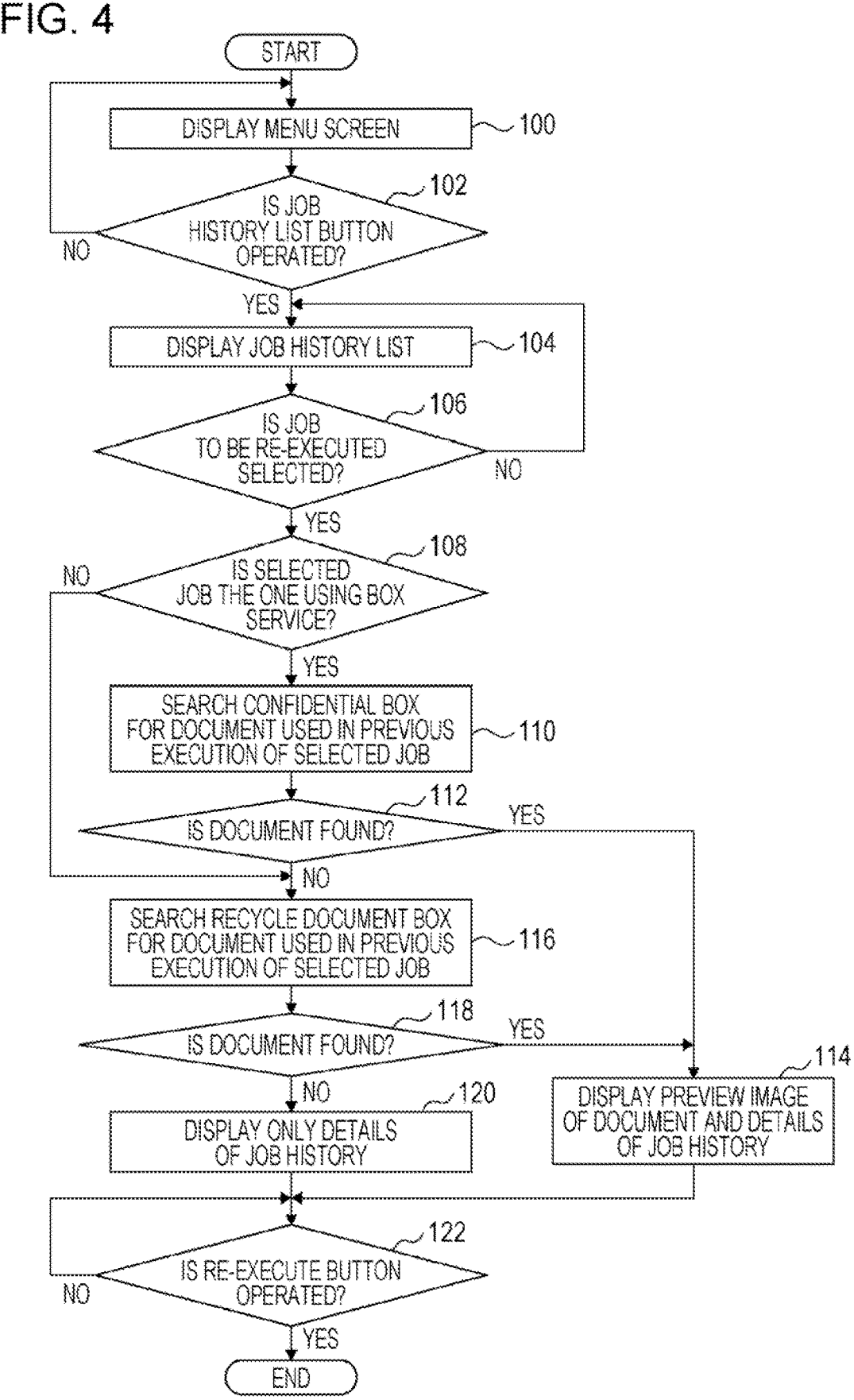
FIG. 4 is a flowchart illustrating an example of processing executed by the controller of the image forming apparatus from when a job history is displayed until an instruction to re-execute a job is provided.

Processing from when a job history is displayed until when an instruction to re-execute processing is provided will first be discussed below. FIG. 4 is a flowchart illustrating an example of processing executed by the controller 20 from when a job history is displayed until when an instruction to re-execute a job is provided. The processing in FIG. 4 may be started after the image forming apparatus 10 has performed a certain starting operation or when a user has performed an operation for displaying a menu screen by using the user interface 22.

Figure 5:
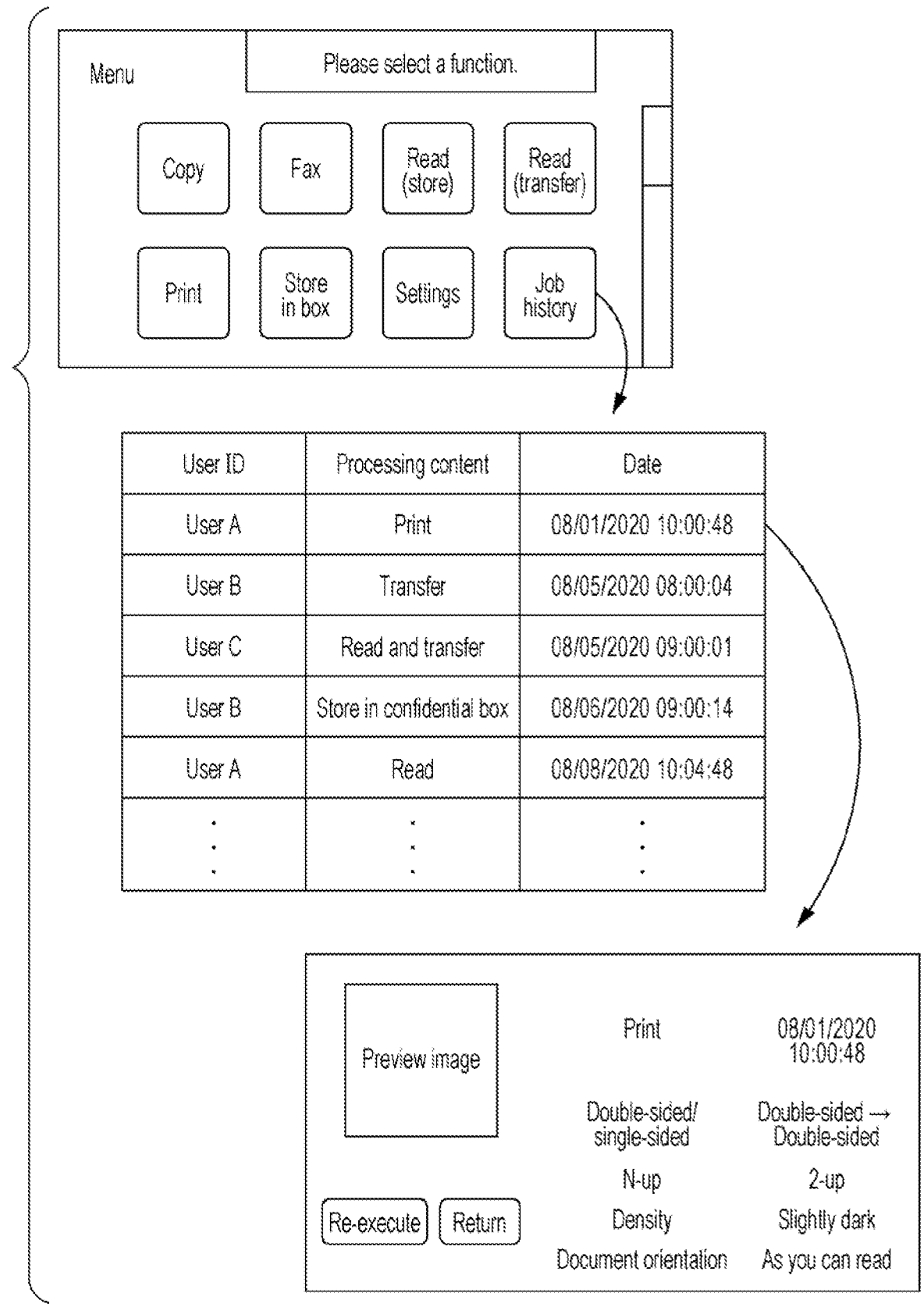
FIG. 5 illustrates examples of screens displayed on a user interface of the image forming apparatus.

In step 100, the CPU 20A displays a predetermined menu screen, such as the menu screen shown in the upper part of FIG. 5, on the display 22A and then proceeds to step 102.

In step 102, the CPU 20A judges whether a job history list button is operated to provide an instruction to display a job history list of jobs executed in the past. This judgement may be made by determining whether the job history list button shown in the upper part of FIG. 5 is operated. If the result of step 102 is YES, the CPU 20A proceeds to step 104. If the result of step 102 is NO, the CPU 20A returns to step 100 and repeats steps 100 and 102.

In step 104, the CPU 20A displays a job history list, such as that shown in the middle part of FIG. 5, on the display 22A and then proceeds to step 106. In the job history list in FIG. 5, all the job histories are displayed without specifying a user. However, if a user is identified by user authentication, the histories of jobs only executed by this user in the past may be displayed. For example, only the histories of the jobs executed by user A indicated in the middle part of FIG. 5 may be displayed.

In step 106, the CPU 20A judges whether the user has performed an operation for selecting the history of a job to be re-executed. This judgement may be made by determining whether one of the job histories in the job history list in the middle part of FIG. 5 has been selected. If the result of step 106 is YES, the CPU 20A proceeds to step 108. If the result of step 106 is NO, the CPU 20A returns to step 104 and repeats steps 104 and 106.

In step 108, the CPU 20A judges whether the job of the selected job history is a job using a box service. This judgement may be made by determining whether the user has selected the job history of a job using a box service, such as a confidential box. If the result of step 108 is YES, the CPU 20A proceeds to step 110. If the result of step 108 is NO, the CPU 20A proceeds to step 116.

In step 110, the CPU 20A searches the confidential box for the document used in the previous execution of the selected job and then proceeds to step 112.

In step 112, the CPU 20A judges whether the document has been found. If the result of step 112 is YES, the CPU 20A proceeds to step 114. If the result of step 112 is NO, the CPU 20A proceeds to step 116. If the user is identified by user authentication, even if a document has been found but is a document of a user other than the authenticated user, the result of step 112 may be negated from a security viewpoint.

In step 114, the CPU 20A displays a preview image of the document and details of the job history on the display 22A and then proceeds to step 122. For example, as indicated in the lower part of FIG. 5, the CPU 20A displays a preview image representing document information, such as a thumbnail image of the first page or an image of the first character string, together with the details of the job history.

In step 116, the CPU 20A searches the recycle document box 26A for the document used in the previous execution of the selected job and then proceeds to step 118.

In step 118, the CPU 20A judges whether the document has been found. If the result of step 118 is YES, the CPU 20A proceeds to step 114. If the result of step 118 is NO, the CPU 20A proceeds to step 120. If the user is identified by user authentication, even if a document has been found but is a document of a user other than the authenticated user, the result of step 118 may be negated from a security viewpoint.

In step 120, the CPU 20A displays only details of the job history on the display 22A and proceeds to step 122. In step 120, the CPU 20A displays only setting information used in the execution of a past job, for example.

In step 122, the CPU 20A judges whether a re-execute button, such as the "re-execute" button shown in the lower part of FIG. 5, is operated to give an instruction to re-execute the job of the selected job history. If the result of step 122 is NO, the CPU 20A waits until the re-execute button is operated, and then completes the processing in FIG. 4. If a button other than the re-execute button is operated while the CPU 20A is in the standby state, the CPU 20A terminates the processing in FIG. 4 and executes processing corresponding to the operated button.

Figure 6:
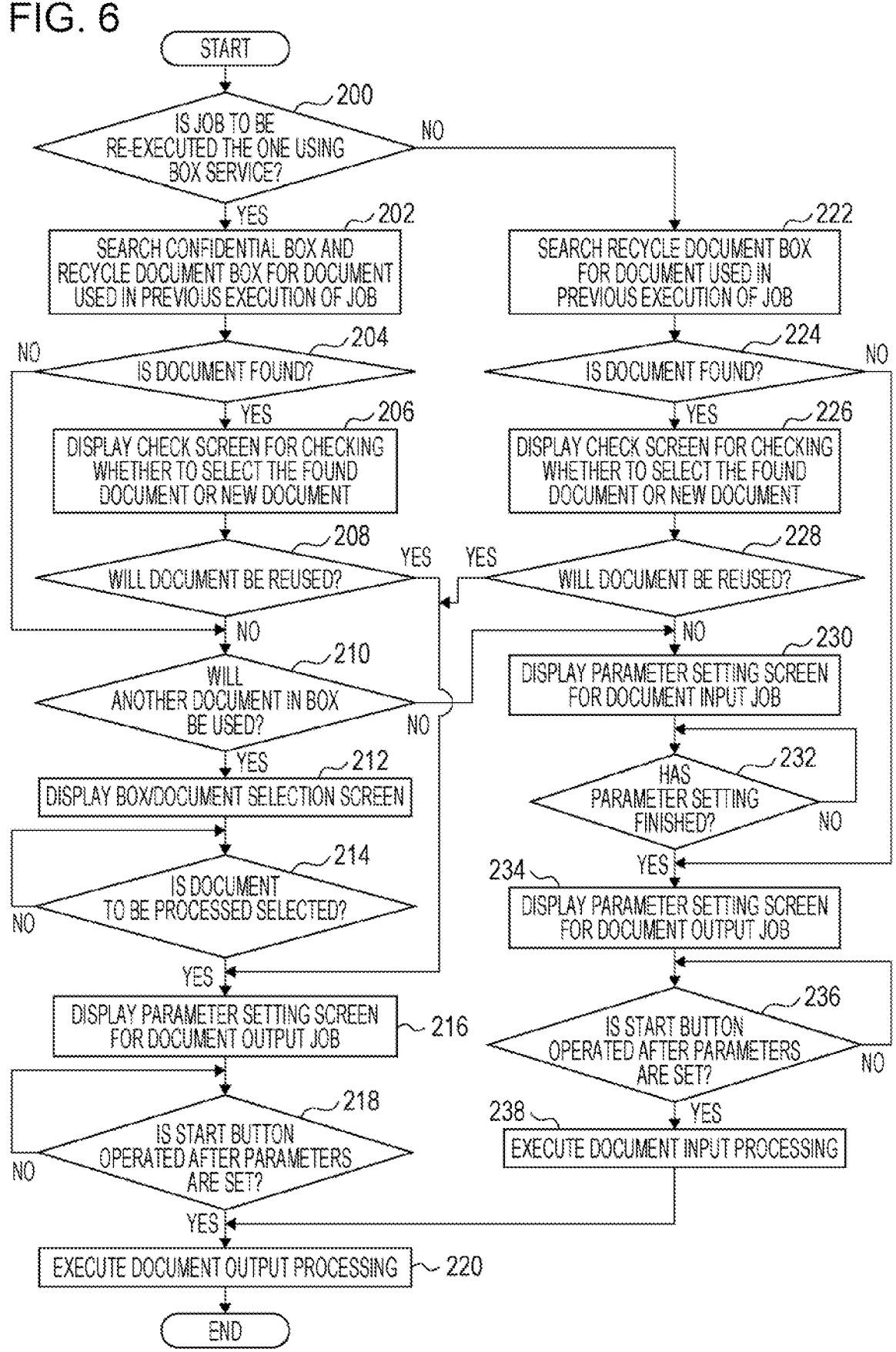
FIG. 6 is a flowchart illustrating an example of processing executed by the controller of the image forming apparatus when a re-execute button is operated.

Specific processing to be executed when the re-execute button is operated in step 122 will be discussed blow. FIG. 6 is a flowchart illustrating an example of processing executed by the controller 20 of the image forming apparatus 10 when the re-execute button is operated.

In step 200, the CPU 20A judges whether the job to be re-executed is a job using a box service, such as a service using a confidential box. If the result of step 200 is YES, the CPU 20A proceeds to step 202. If the result of step 200 is NO, the CPU 20A proceeds to step 222.

In step 202, the CPU 20A searches the confidential box and the recycle document box 26A for the document used in the previous execution of the job and proceeds to step 204.

In step 204, the CPU 20A judges whether the document has been found. If the result of step 204 is YES, the CPU 20A proceeds to step 206. If the result of step 204 is NO, the CPU 20A proceeds to step 210. Since steps 108, 110, 112, 116, and 118 have been executed in the processing in FIG. 4, steps 200 through 204 may be omitted, in which case, information indicating whether the document has been found is stored.

In step 206, the CPU 20A displays a check screen for checking whether to select the document found in step 204 or another document and then proceeds to step 208.

In step 208, the CPU 20A judges whether the previously used document will be reused. If the result of step 208 is NO, the CPU 20A proceeds to step 210. If the result of step 208 is YES, the CPU 20A proceeds to step 216.

In step 210, the CPU 20A judges whether a document in the confidential box will be used. If the result of step 210 is YES, the CPU 20A proceeds to step 212. If the result of step 210 is NO, the CPU 20A proceeds to step 230.

In step 212, the CPU 20A displays a box/document selection screen on the display 22A and then proceeds to step 214. That is, in step 212, the CPU 20A displays a screen for selecting a confidential box and also a document.

In step 214, the CPU 20A judges whether a document to be processed is selected. In step 214, the CPU 20A waits until a document is selected, and if the result of step 214 becomes YES, the CPU 20A proceeds to step 216.

In step 216, the CPU 20A displays a parameter setting screen for a document output job on the display 22A and then proceeds to step 218. For example, a parameter setting screen is displayed on the display 22A in a state in which parameters used in the previous execution of the job are set as defaults. Parameters that cannot be changed may be displayed in a manner recognizable for the user. On the parameter setting screen, the user may adjust parameters if necessary.

In step 218, the CPU 20A judges whether the start button has been operated after the user has set parameters. The CPU 20A waits until the result of step 218 becomes YES and then proceeds to step 220.

In step 220, the CPU 20A executes document output processing and then completes the processing in FIG. 6. That is, the document storage processor 64 reads the selected document information and causes the application manager 60 to execute processing, such as image forming, based on the document information and outputs the document.

In step 222, the CPU 20A searches the recycle document box 26A for the document used in the previous execution of the job and then proceeds to step 224.

In step 224, the CPU 20A judges whether the document has been found. If the result of step 224 is YES, the CPU 20A proceeds to step 226. If the result of step 224 is NO, the CPU 20A proceeds to step 234. Since steps 108, 110, 112, 116, and 118 have been executed in the processing in FIG. 4, steps 200, 222, and 224 may be omitted, in which case, information indicating whether the document has been found is stored.

In step 226, the CPU 20A displays a check screen for checking whether to select the document found in step 224 or another document and then proceeds to step 228.

In step 228, the CPU 20A judges whether the previously used document will be reused. If the result of step 228 is NO, the CPU 20A proceeds to step 230. If the result of step 228 is YES, the CPU 20A proceeds to step 216.

In step 230, the CPU 20A displays a parameter setting screen for a document input job on the display 22A and then proceeds to step 232. That is, the CPU 20A displays a screen for setting parameters, which serve as conditions for inputting a document, on the display 22A.

In step 232, the CPU 20A judges whether the setting of parameters for the document input job has finished. This judgement may be made by determining whether an operation for finishing the setting of parameters has been performed. The CPU 20A waits until the result of step 232 becomes YES and then proceeds to step 234.

In step 234, the CPU 20A displays a parameter setting screen for a document output job on the display 22A and then proceeds to step 236. For example, a screen is displayed on the display 22A in a state in which parameters used in the previous execution of the job are set as defaults. On the parameter setting screen, the user may adjust parameters if necessary.

In step 236, the CPU 20A judges whether the start button has been operated after the user has set parameters. The CPU 20A waits until the result of step 236 becomes YES and then proceeds to step 238.

In step 238, the CPU 20A executes document input processing and then proceeds to step 220. In step 220, the CPU 20A executes document output processing and then completes the processing in FIG. 6. That is, the document storage processor 64 reads the document as document input processing and then executes document output processing, such as image forming, based on the read document.

A modified example of the processing in FIG. 4 will be described below. FIG. 7 is a flowchart illustrating an example of a modified example of processing executed by the controller 20 from when a job history is displayed until when an instruction to re-execute a job is provided. The processing in FIG. 7 may be started after the image forming apparatus 10 has performed a certain starting operation or when a user has performed an operation for displaying a menu screen by using the user interface 22. The same operations as those in FIG. 4 are designated by like step numbers.

In step 100, the CPU 20A displays a predetermined menu screen on the display 22A and then proceeds to step 102.

In step 102, the CPU 20A judges whether a job history list button for displaying a job history list of jobs executed in the past is operated. If the result of step 102 is YES, the CPU 20A proceeds to step 103. If the result of step 102 is NO, the CPU 20A returns to step 100 and repeats steps 100 and 102.

In step 103, the CPU 20A displays a job history list including re-execute buttons on the display 22A and then proceeds to step 105. That is, the CPU 20A displays a re-execute button for each job history in the job history list.

In step 105, the CPU 20A judges whether a re-execute button in the job history list is operated. This judgment is made by determining whether the re-execute button in any of the job histories in the job history list is operated. The CPU 20A waits until the result of step 105 becomes YES. The CPU 20A then completes the processing in FIG. 7 and starts the processing in FIG. 6.

In the processing in FIG. 7, a screen for detailed information of each job history is not displayed. Instead, when the job history list is displayed, a re-execute button is displayed for each job history in the list. That is, a step of displaying detailed information is omitted, and an instruction to re-execute a past job is received on the job history list.

In the above-described exemplary embodiment, user authentication may be conducted to identify a user and the job histories of jobs only executed by the identified user may be displayed. However, this is only an example. Alternatively, for a user identified by user authentication, when this user has selected a past job from a job history list, document information and setting information may be displayed on the display 22A. For a user other than the authenticated user, document information is not displayed, and only setting information of a job to be re-executed is displayed. That is, this user is allowed to reuse only setting information when re-executing a past job.

In the above-described exemplary embodiment, if document information in a job history selected from the job history list has already been deleted by the stored document remover 66, only setting information of this job may be displayed. That is, a user is allowed to reuse only the setting information.

Processing executed by the controller 20 of the image forming apparatus 10 may be executed by software or hardware or a combination thereof. Processing operations executed by the individual elements of the controller 20 may be stored in a storage medium as a program and be distributed.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
store document information of a document in a predetermined storage region when processing that does not include a storing process of the document is executed on the document;
display the document information stored in the predetermined storage region on a display when executing processing, the document information including at least one item of the document information, and cause a user to select an item of the document information from the at least one item of the document information; and
execute processing by using the selected item of the document information.

2. The information processing apparatus according to claim 1, wherein:
   the processor is configured to also store setting information used for past execution of processing in the predetermined storage region; and
   the processor is configured to reuse the setting information when executing processing by using the selected item of the document information.

3. The information processing apparatus according to claim 2, wherein:
   the processor is configured to specify a user; and
   when displaying the document information stored in the predetermined storage region, the processor is configured to display the document information and the setting information regarding processing executed by the specified user and to display the setting information regarding processing executed by a user other than the specified user.

4. The information processing apparatus according to claim 2, wherein the processor is configured to receive a change to the setting information stored in the predetermined storage region and to execute processing by using the selected item of the document information.

5. The information processing apparatus according to claim 3, wherein the processor is configured to receive a change to the setting information stored in the predetermined storage region and to execute processing by using the selected item of the document information.

6. The information processing apparatus according to claim 2, wherein the processor is configured to display a screen for receiving a change to the setting information and to display a parameter that is able to be changed or a parameter that is unable to be changed in a recognizable display mode, the parameters forming the setting information.

7. The information processing apparatus according to claim 3, wherein the processor is configured to display a screen for receiving a change to the setting information and to display a parameter that is able to be changed or a parameter that is unable to be changed in a recognizable display mode, the parameters forming the setting information.

8. The information processing apparatus according to claim 4, wherein the processor is configured to display a screen for receiving a change to the setting information and to display a parameter that is able to be changed or a parameter that is unable to be changed in a recognizable display mode, the parameters forming the setting information.

9. The information processing apparatus according to claim 5, wherein the processor is configured to display a screen for receiving a change to the setting information and to display a parameter that is able to be changed or a parameter that is unable to be changed in a recognizable display mode, the parameters forming the setting information.

10. The information processing apparatus according to claim 1, wherein the processor is configured to store an item of the document information that satisfies a predetermined condition.

11. The information processing apparatus according to claim 2, wherein the processor is configured to store an item of the document information that satisfies a predetermined condition.

12. The information processing apparatus according to claim 3, wherein the processor is configured to store an item of the document information that satisfies a predetermined condition.

13. The information processing apparatus according to claim 4, wherein the processor is configured to store an item of the document information that satisfies a predetermined condition.

14. The information processing apparatus according to claim 5, wherein the processor is configured to store an item of the document information that satisfies a predetermined condition.

15. The information processing apparatus according to claim 6, wherein the processor is configured to store an item of the document information that satisfies a predetermined condition.

16. The information processing apparatus according to claim 1, wherein the processor is configured to delete an item of the document information stored in the predetermined storage region, based on at least one of a past processing date of the item of the document information and the number of execution times of the item of the document information.

17. The information processing apparatus according to claim 16, wherein the processor is configured to reuse only setting information used for past execution of processing if an item of the document information used for the past execution of processing is deleted from the predetermined storage region.

18. The information processing apparatus according to claim 1, wherein the processor is configured to display an image representing the document information stored in the predetermined storage region when displaying the document information on the display.

19. An information processing method comprising:
   storing document information of a document in a predetermined storage region when processing that does not include a storing process of the document is executed on the document;
   displaying the document information stored in the predetermined storage region on a display when executing processing, the document information including at least one item of the document information, and causing a user to select an item of the document information from the at least one item of the document information; and
   executing processing by using the selected item of the document information.

20. A non-transitory computer readable medium storing a program causing a computer to execute a process, the process comprising:
   storing document information of a document in a predetermined storage region when processing that does not include a storing process of the document is executed on the document;
   displaying the document information stored in the predetermined storage region on a display when executing processing, the document information including at least one item of the document information, and causing a user to select an item of the document information from the at least one item of the document information; and
   executing processing by using the selected item of the document information.

* * * * *